(No Model.)

R. A SHAY.
VEHICLE WHEEL.

No. 535,960. Patented Mar. 19, 1895.

Witnesses
J. W. Reynolds
Chas. S. Hyer.

Inventor
Russell A. Shay.
By John Wedderburn
Attorney.

UNITED STATES PATENT OFFICE.

RUSSELL A. SHAY, OF NEW YORK, N. Y.

VEHICLE-WHEEL.

SPECIFICATION forming part of Letters Patent No. 535,960, dated March 19, 1895.

Application filed March 19, 1894. Serial No. 504,297. (No model.)

*To all whom it may concern:*

Be it known that I, RUSSELL A. SHAY, a citizen of the United States, and a resident of New York, in the county of New York and State of New York, have invented certain new and useful Improvements in Vehicle-Wheels; and I do hereby declare the following to be a full, clear, and exact description of the invention, such as will enable others skilled in the art to which it appertains to make and use the same.

The present invention has for its object the provision of a wheel for vehicles which will be both light and neat, and which will admit of a spoke being readily removed for any cause without requiring the loosening of any of the other spokes or the straining of the wheel, and will admit of any looseness in the joints caused by a skrinkage of the spokes, or vibration being taken up.

The improvement consists essentially of a tubular axle box having exteriorly threaded ends and radial projections between the ends to become seated in the end of the spokes, spoke bands, one of the said bands being wedge shaped projections to come between the meeting edges of the spokes at the hub ends, inner and outer oppositely disposed wedge shaped bands, the outer wedge shaped bands being internally threaded to screw upon the threaded ends of the axle box, and bolts passing laterally through the hub bands, the spokes and inner wedge shaped bands to secure these parts together.

The improvement further consists of the novel features and the peculiar construction and combination of the parts which hereinafter will be more fully described and claimed and which are shown in the accompanying drawings, in which—

Figure 1:
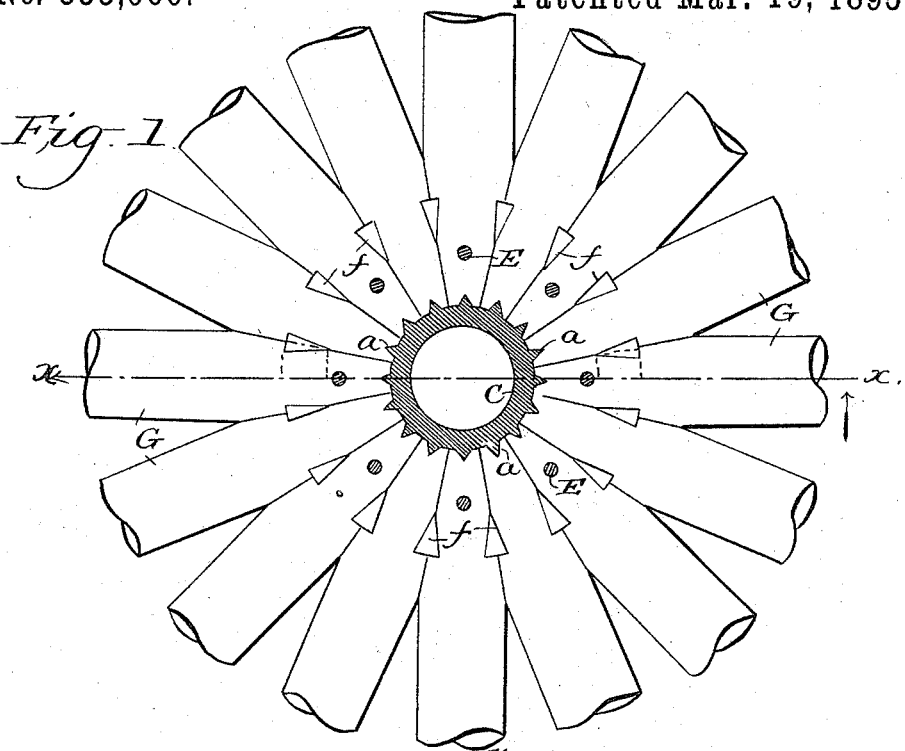
Figure 2:
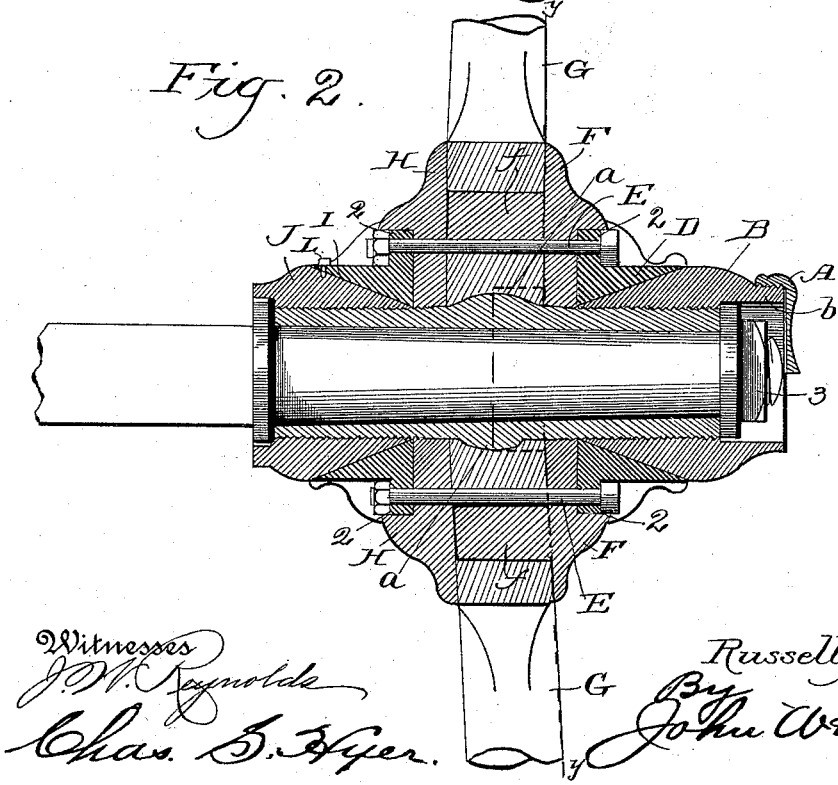

Figure 1, is a section on the line Y—Y, Fig. 2, broken away to show the relative disposition of the spokes, the axle box, and the wedge shaped projection which enter corresponding recesses provided between the meeting edges of the hub ends of the spokes. Fig. 2, is a cross section on the line X X of Fig. 1 looking in the direction of the arrow.

The axle box C, is tubular, and is externally threaded for a short distance from each end and is provided about midway of its ends with radial projection $a$. It is not essential that the projection $a$ be provided, but a more stable wheel is obtained by the provision of the same, and the portions constituting the hub which prevent from turning on the axle box in the event of looseness of the joints. Spoke bands H and F of similar construction are mounted on the axle box and have bolt openings to receive the bolts E by means of which the parts are secured together. These spoke bands are of similar construction, and extend outward on the spokes a sufficient distance to brace the same laterally and have central recesses to provide shoulders 2 which overlap the inner ends of the hub bands I and D.

One of the spoke bands as F, is provided with a series of wedge shaped projections $f$ which are designed to enter recesses provided by notching the opposite sides of the hub ends of the spokes. In the preferred form of construction, these projections $f$ extend only about half the distance between the edges of the spokes and the length of the said projections is immaterial as they may extend from one spoke band to the other. The hub-bands I and D are of similar construction and taper from the inner to the outer edges. The end bands J and B are of corresponding shape to the hub bands and incline in an inverse direction and are interiorly threaded to screw upon the threaded ends of the axle box. The outer end band B has an extension $b$, which extends over the axle nut 3 and is externally threaded to receive a cap A, by means of which the axle nut 3 is housed and the tar and grease prevented from soiling the hands or clothing. This cap A also prevents the entrance of dust and sand into the space inclosed by the annular extension $b$. The spoke G, the spoke bands H, F, and the hub bands I and D, have bolt openings in coincident relation to receive the bolts E by means of which the parts when assembled are secured together.

It will be understood that a bolt will be provided for each spoke in the wheel. Inasmuch as the hub bands I and D incline on their outer faces, provision must be had to receive the heads and nuts of the bolts E by notching or providing recesses in the said hub bands in line with the bolt openings whereby seats are provided to receive the bolt heads or nuts as shown most clearly in Fig. 2, thereby obviating the abutments which would otherwise be provided if the said bolt heads and nuts, were not seated as herein specified.

To prevent relative turning of the end band J, and the hub band I, an opening screw L is provided and extends across the joint provided between the said bands J and I.

When all the parts are in position as shown in Fig. 2, the binding screw L is placed in position to prevent an intrograde movement of the band J on the axle box, and a loosening of the joint between the said bands J and I. By providing the radial projections a, which are knife edged and incline in opposite directions from an intermediate point, the spokes and the spoke holding the clamping devices are prevented from turning relatively on the axle box. These projections enter seats provided in the inner ends of the spokes as shown most clearly in Fig. 1.

In assembling the parts the spokes are fitted to the hub band F by being pressed between the wedge shaped projections f, and after the spokes are in position, the spoke band F with the spokes attached thereto is placed upon the axle box, and the spoke and hub and end bands D and B are placed in position, the end band B being screwed upon the threaded end of the axle box. The spoke band H, the hub band I and the end band J are each placed in position on the opposite end of the axle box in the order named. Care must be taken to have the spokes and hub bands nicely adjusted so that the bolt openings therein will be in register to receive the bolts when the latter are driven home. The end bands J and B are properly adjusted on the axle box by screwing them up or back as required to get the parts in the required position.

The cap A is screwed on the threaded end of the extension b after the wheel is mounted upon the spindle of the axle, the latter being provided with the usual collar which limits the inner movement of the wheel thereon. In the event of a spoke being broken, or being desired to remove a spoke for any purpose, the nuts or ends of the bolts E are removed and the bands J, I and H removed, when the required spoke can be readily detached without affecting the remaining spokes of the wheel. After a new spoke is substituted, the parts can be quickly placed together, and the wheel will be as solid and stable as when new. Should a joint become loosened from any cause, either by shrinkage of the spokes or by the vibratory movements of the wheel, the slack can be readily taken up both by tightening the bolts E and screwing up the bands J and B as will be readily understood.

It will be observed that I have made the parts F and D, and H and I separate. This is done for the purpose of giving greater elasticity to the spoke clamp and to prevent breakage of the parts when struck by an obstacle. It is also for the purpose of preventing the loosening of the spoke when one part is accidentally broken. For example, if the wagon struck the part D, it would only crack this part, and the part F would still be perfect. If made in one piece it would crack the whole piece of metal, thereby seriously injuring the wheel and loosening the spoke; and to replace this piece would necessitate the taking of the entire wheel apart. When made of two pieces, however, the part F would still be perfect and the wheel as good as new, as the part D would be the only one to be replaced.

Having thus described the invention, what is claimed as new is—

The herein shown and described hub for vehicle wheels, comprising the following elements: a tubular axle box having radial projections midway of its ends, spoke bands loosely mounted on the axle box and having wedge shaped projections, spokes placed between the spoke bands and fitted between the said wedge shaped projections, and having seats at their inner ends to receive the said radial projections, wedge shaped hub bands arranged one on each side of the plane of the spokes and having notches or depressions to form seats for the bolt heads and nuts, end wedged shaped bands adapted to screw upon the threaded ends of the axle box, the outer band having a projection to receive a cap by means of which the axle nut is closed in, and a binding screw to prevent relative turning of the inner end wedge shaped band, and bolts passing through coincident openings in the spokes, spoke and hub bands, substantially as shown and set forth.

In testimony whereof I have signed this specification in the presence of two subscribing witnesses.

RUSSELL A. SHAY.

Witnesses:
 EDW. B. HANLON,
 JESSE T. WHITE.